US008419320B2

(12) United States Patent
Sung et al.

(10) Patent No.: US 8,419,320 B2
(45) Date of Patent: Apr. 16, 2013

(54) MILLING CUTTING TOOL EMPLOYING A CUTTING INSERT (75) Inventors: Wook Jung Sung, Ochang-eup (KR); Ki Chan Nam, Heungdeok-gu (KR)

(73) Assignee: Korloy Inc, Seoul (KR)

( * ) Notice: Subject to any disclaimer, the term of this patent is extended or adjusted under 35 U.S.C. 154(b) by 335 days.

(21) Appl. No.: 12/989,258

(22) PCT Filed: Jan. 6, 2010

(86) PCT No.: PCT/KR2010/000063
§ 371 (c)(1),
(2), (4) Date: Oct. 22, 2010

(87) PCT Pub. No.: WO2010/079948
PCT Pub. Date: Jul. 15, 2010

(65) Prior Publication Data
US 2011/0038677 A1   Feb. 17, 2011

(30) Foreign Application Priority Data
Jan. 6, 2009  (KR) ........................ 10-2009-0000896

(51) Int. Cl.
B23C 5/06      (2006.01)
B23C 2200/00   (2006.01)

(52) U.S. Cl.
USPC ............................................ 407/113; 407/66

(58) Field of Classification Search .................. 407/113, 407/114, 115, 116, 117, 100, 103
See application file for complete search history.

(56) References Cited

U.S. PATENT DOCUMENTS 3,636,602 A * 1/1972 Owen ............................ 407/113
4,531,864 A * 7/1985 Bylund .......................... 407/114

(Continued)

FOREIGN PATENT DOCUMENTS

| CN | 101296771 A | 10/2008 |
|---|---|---|
| EP | 1 468 770 A1 | 10/2004 |
| KR | 10-2006-0102398 A | 9/2006 |
| KR | 698383 | 3/2007 |
| KR | 1020080059263 A | 6/2008 |
| WO | WO 2007/049617 A1 | 5/2007 |

OTHER PUBLICATIONS

International Search Report dated Jul. 29, 2010.

(Continued)

*Primary Examiner* — Will Fridie, Jr.

(74) *Attorney, Agent, or Firm* — Scully, Scott, Murphy & Presser, P.C.

(57) ABSTRACT

Disclosed is a cutting tool for milling works which employs a cutting insert. The cutting tool for milling works employs a cutting insert. By forming a concave nick cutting edge on the lateral surface of the cutting insert, it may cut a chip in a short form in case of high depth of cutting to shorten the effective cutting edge, so as to reduce a friction and a cutting resistance, thereby increasing the life span of the cutting tool as well as to facilitate a chip disposal and reduce the cutting resistance, so as to increase a feed rate at a high depth of cutting, thereby enhancing the productivity of the cutting works. By forming concave recesses on the upper and lower surfaces of the cutting insert it may reduce the cutting resistance between the chip being short cut by the concave nick cutting edge and the upper and lower surfaces. By forming a concave nick cutting edge at a major cutting edge of the cutting insert it is possible to perform a nick cutting edge function without deforming the seat lateral surface of a seat portion to couple the cutting insert with a cutter body.

13 Claims, 4 Drawing Sheets

U.S. PATENT DOCUMENTS

| | | | |
|---|---|---|---|
| 4,867,616 A | 9/1989 | Jakubowicz | |
| 5,221,164 A * | 6/1993 | Allaire | 407/113 |
| 6,196,771 B1 | 3/2001 | Andersson | |
| 6,200,072 B1 | 3/2001 | Andersson | |
| 6,632,051 B1 * | 10/2003 | Wermeister | 407/114 |
| 7,591,614 B2 * | 9/2009 | Craig | 407/66 |
| 8,113,746 B2 * | 2/2012 | Koga | 407/113 |
| 8,142,113 B2 * | 3/2012 | Ishida | 407/113 |
| 2004/0208714 A1 | 10/2004 | Stabel et al. | |

OTHER PUBLICATIONS

Chinese Official Action mailed Dec. 12, 2011 in corresponding Chinese Patent Application No. 201080001466.3.

* cited by examiner

MILLING CUTTING TOOL EMPLOYING A CUTTING INSERT

TECHNICAL FIELD

The present invention relates to a cutting insert, and particularly to a cutting tool for milling works which employs a cutting insert. More particularly, the present invention relates to a cutting tool for milling works which employs a cutting insert, wherein by forming a concave nick cutting edge on the lateral surface of the cutting insert it may cut a chip in a short form in case of high depth of cutting to shorten an effective cutting edge, so as to reduce a friction and a cutting resistance, thereby increasing the life span of the cutting tool as well as to facilitate a chip disposal and reduce the cutting resistance, so as to increase a feed rate at a high depth of cutting, thereby enhancing the productivity of the cutting works, wherein by forming concave recesses on the upper and lower surfaces of the cutting insert it may reduce the cutting resistance between the chip being short cut by the concave nick cutting edge and the upper and lower surfaces, and wherein by forming a concave nick cutting edge at a major cutting edge of the cutting insert it is possible to perform a nick cutting edge function without deforming the seat lateral surface of a seat portion to couple the cutting insert with a cutter body.

BACKGROUND ART

In general, a cutting tool is used to typically cut a ferrous or non-ferrous metal, or non-metallic material, which is installed to a machine tool for performing a cutting operation in order to make a workpiece in a desired shape. A cutting method using the cutting tool generally includes a turning work in which a fixed cutting tool cuts a rotating workpiece and a milling work in which the cutting tool rotates to cut the fixed workpiece. In the turning work, a cutting insert is mounted on the seat portion of a cutting tool body, i.e., a cutter body, which performs an inner diameter portion cutting, an outer diameter portion cutting, contouring or the like. In contrast, in the milling work, a cutting insert is mounted on the insert seat portion of a cutter body to perform a planar cutting, a lateral cutting, a groove cutting, an inclination cutting, a curved surface cutting or the like.

The milling work as mentioned above, wherein the cutting tool rotates to cut the fixed workpiece, conventionally employs an one-sided type cutting insert in which a cutting edge is typically provided only on the upper surface in order to prevent interference between the cutting tool and the workpiece and further to ensure even sharper cutting blade. However, various studies have been made to resolve the drawbacks retained in the one-sided type cutting insert.

The U.S. Pat. Nos. 6,196,771 and 6,200,072, European Patent No. 1,468,770 and United States Patent Application Publication No. 2004/208,714 disclose the cutting tools developed for such purposes.

The cutting insert to be mounted on the cutter body of the milling machine, which is disclosed in the U.S. Pat. No. 6,196,771 or 6,200,072, has drawbacks in that since a chip is discharged along the surface of the upper or lower surface during the cutting operation, it is not regarded as an optimal method to address a molten deposition or adherence of the chip on the upper or lower surface, and further is not capable of improving the roughness of the machined surface.

In order to solve the above drawbacks, the applicant of this invention filed and acquired the Korean Patent No. 698,383. This patent is provided with a cutting insert formed with cutting edge portions on the opposite sides thereof and a cutter body formed with one or more insert seats with which the cutting insert is easily coupled, such that it can prolong the life span of the cutting insert and the cutter body, improve the roughness of the machined surface, and maximize the cutting efficiency.

In this regard, the present invention is designed to perform a further study on the cutting insert and the cutting tool for milling works in which the chip is to be cut in a short form in case of high depth of cutting, thereby reducing the friction and the cutting resistance as well as increasing the productivity of the cutting works therethrough.

DISCLOSURE

Technical Problem

Therefore, the present invention has been made in view of the above-mentioned problems, and an object of the present invention is to provide a cutting tool for milling works which employs a cutting insert, wherein it may cut a chip in a short form in case of high depth of cutting to shorten the effective cutting edge, so as to reduce a friction and a cutting resistance, thereby increasing the life span of the cutting tool as well as to facilitate a chip disposal and reduce the cutting resistance, so as to increase a feed rate at a high depth of cutting, thereby enhancing the productivity of the milling works, and wherein it may reduce the cutting resistance between the chip being short cut by the concave nick cutting edge and the upper and lower surfaces.

Technical Solution

In accordance with an aspect of the present invention, there is provided a cutting tool for milling works including a cutting insert which is perpendicularly and penetratingly formed with a circular opening in its center, a cutter body on which the cutting insert is mounted, and a coupling means to secure the cutting insert to the cutter body, the cutting insert including an upper surface and a lower surface, and a lateral surface connecting the upper surface and the lower surface, wherein the upper or the lower surface meets the lateral surface to form a major cutting edge, and wherein at least one major cutting edge is provided with one or more concave nick cutting edges.

The number of the concave nick cutting edges can be determined in various manners. For example, the concave nick cutting edge may be symmetrically provided in the left and right direction in an even number, i.e., at least two at any opposing two major cutting edges or neighboring two major cutting edges, respectively. Otherwise, the concave nick cutting edges may be provided in an odd number i.e., at least three at any opposing two major cutting edges.

When the concave nick cutting edge is provided in an odd number, the concave nick cutting edge may be composed of a central concave nick cutting edge formed at the respective two major cutting edges, and opposite concave nick cutting edges symmetrically provided in the left and right direction about the central concave nick cutting edge.

Further, according to the preferred embodiment, the upper surface or the lower surface is provided with a concave recess. Here, preferably the concave recess is formed in the same number corresponding to each concave nick cutting edge.

In addition, the location of the concave recess may be established in various manners. In other words, the concave recess may be formed in an inward direction perpendicular to the lateral surface from the concave nick cutting edge, or in an inward direction at the center of the upper surface or the lower surface from the concave nick cutting edge.

Moreover, preferably the surface of the concave recess may be formed of a semi-sphere shape.

Meanwhile, preferably the cutting insert in accordance with the present invention is a two-sided type insert of which upper and lower surfaces perform a cutting work.

When applied to the two-sided type insert, it is desirable that the concave nick cutting edge may, for example and without limitation, be correspondingly formed in the upward and downward direction at the major cutting edge of the upper surface and the major cutting edge of the lower surface. But, the concave nick cutting edge may be not correspondingly formed and disposed in the upward and downward direction at the major cutting edge of the upper surface and the major cutting edge of the lower surface.

In addition, when applied to the two-sided type insert, preferably the concave nick cutting edge may be provided in a trench shape along the lateral surface so as to connect the concave nick cutting edge which is correspondingly formed at the major cutting edge of the upper surface and the lower surface.

Further, when applied to the two-sided type insert, it is desirable that the insert includes a corner lateral surface to connect the neighboring lateral surfaces and a minor lateral surface to connect the corner lateral surface at the opposite sides of the corner lateral surface. The upper surface or the lower surface meets the minor lateral surface to form a minor cutting edge. Between the minor cutting edge and the major cutting edge a corner cutting edge is formed to connect the major cutting edge and the minor cutting edge. A circular opening which penetrates into the center of the upper surface and the lower surface is provided. An inclined upper surface and an inclined lower surface are formed near the circular opening on the upper surface and the lower surface.

At this point, preferably the upper and lower surfaces meet the minor lateral surface to form the minor cutting edge, and the a minor cutting edge land surface and a minor cutting edge inclined surface are formed in turn between the minor cutting edge and the upper and lower surfaces.

It is desirable that the minor cutting edge and the corner cutting edge are formed higher than the upper and lower surfaces.

Preferably the major cutting edge is composed of a curved cutting edge which is bent from the upper and lower portion of the center of the respective lateral surfaces to the middle portion of the center of the lateral surface and formed lower than the upper and lower surfaces, and a straight inclined cutting edge which is increasingly extended toward the corner cutting edge at the opposite sides of the curved cutting edge. At this time the major cutting edge may be preferably symmetrical about the curved cutting edge.

Besides, it is desirable that the minor cutting edge is provided as a convex curve, which is projected to the upper portion of the respective corner cutting edges, and is connected to the corner cutting edges disposed at the opposite sides.

Advantageous Effects

According to the present invention, by forming a concave nick cutting edge on the lateral surface of the cutting insert it may cut a chip in a short form in case of high depth of cutting to shorten the effective cutting edge, so as to reduce a friction and a cutting resistance. As a result it may increase the life span of the cutting tool and facilitate a chip disposal as well as reduce the cutting resistance, which makes it possible to increase a feed rate at a high depth of cutting to enhance the productivity of cutting works.

Further, according to the present invention, when the concave nick cutting edge is formed in a trench shape in the upward and downward direction along the lateral surface so as to connect the major cutting edge of the upper surface and the major cutting edge of the lower surface, it may maximize the effects to shorten the effective cutting edge, to reduce the friction, and to reduce the cutting resistance.

Particularly, when the concave nick cutting edge is formed only at the major cutting edge of the cutting insert, it may perform a nick cutting edge function without needs to deform the seat lateral surface of the seat portion in order to couple the cutting insert with the cutter body.

In addition, according to the present invention, by forming concave recesses on the upper and lower surfaces of the cutting insert it may reduce the cutting resistance between the chip being short cut by the concave nick cutting edge and the upper and lower surfaces.

Particularly, by providing concave recesses, which correspond to each concave nick cutting edge, at the inner side of the upper and lower surfaces it may maximize the effects to reduce the cutting resistance generated when the chip being short cut by the concave nick cutting edge is introduced into the inner side of the upper and lower surfaces.

Moreover, by providing the concave nick cutting edge symmetrically in the left and right direction it may bring the effects to increase the life span of the tool since the cutting resistance against the respective cutting edge portions is uniformly applied to reduce the cutting resistance itself.

BRIEF DESCRIPTION OF THE DRAWINGS

The foregoing and other objects, features and advantages of the present invention will become more apparent from the following detailed description when taken in conjunction with the accompanying drawings in which.

BEST MODE

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear. In addition, a preferred embodiment of the present invention will be described hereinbelow, the technical thought of the present invention is not restricted or limited thereto and may be embodied in various manners through modification by those skilled in the art.

While an embodiment will be described below with reference to a two-sided type insert, it will be obviously understood by those skilled in the art that the major features of the present invention will be similarly applied to a one-sided type insert.

In the following description, 'a concave nick cutting edge' refers to a cutting edge portion which is locally cutout in the form of a groove at the cutting edge of the insert or on the lateral surface of the insert. The cross-sectional shape of the concave nick cutting edge being cut out may be typically a circle, triangle, rectangle, polygon or the like, but not limited to a peculiar shape.

Figure 1:
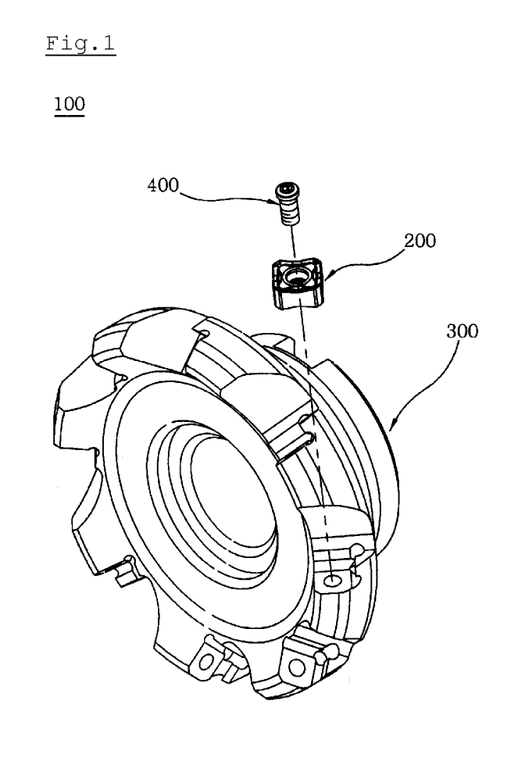
FIG. 1 is an exploded perspective view of a cutting tool for milling works employed with a cutting insert in accordance with the present invention.

FIG. 1 is an exploded perspective view of a cutting tool for milling works employed with a cutting insert in accordance with the present invention.

Referring to FIG. 1, the cutting tool 100 in accordance with the present invention includes a cutting insert 200, a cutter body 300 on which the cutting insert 200 is mounted, and a coupling means to secure the cutting insert 200 to the cutter body 300, preferably a screw 400. Since the method and structure for securing the cutting insert 200 to the cutter body 300 is described in detail in the Korean Patent No. 698,383, which is issued to the applicant of the present invention, the description thereof will be omitted.

Figure 2:
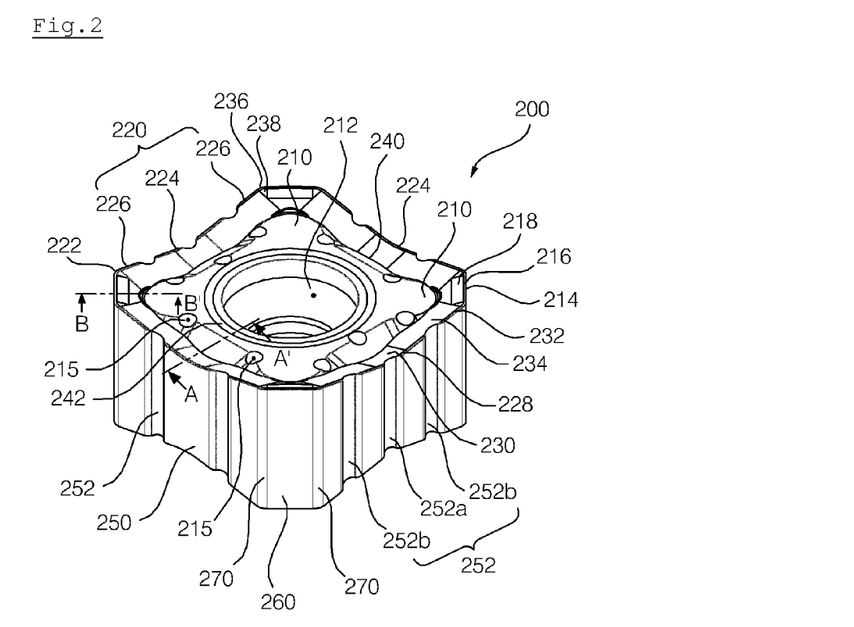
FIG. 2 is a perspective view of a cutting insert in accordance with an embodiment of the present invention.
Figure 3:
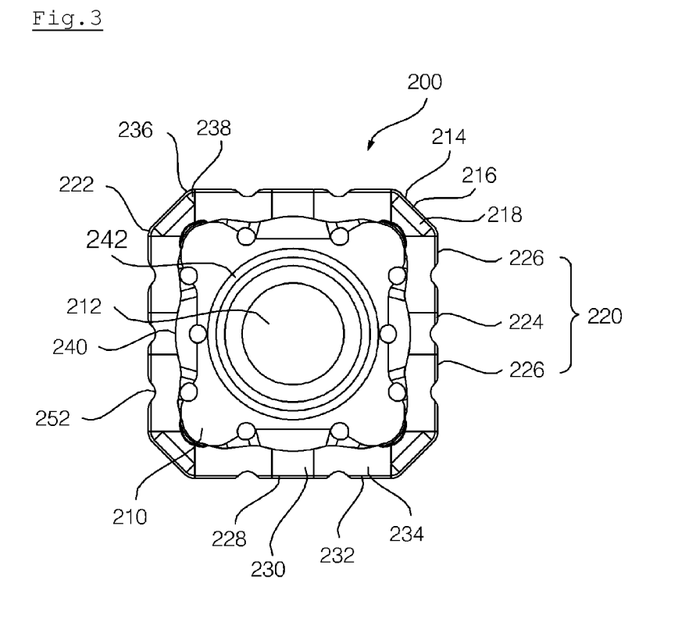
FIG. 3 is a plan view of FIG. 2.
Figure 4:
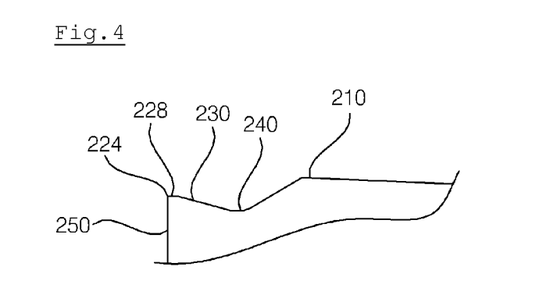
FIG. 4 is a cross-sectional view taken along line A-A' of FIG. 2.
Figure 5:
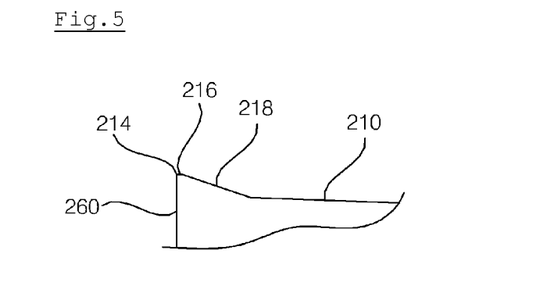
FIG. 5 is a cross-sectional view taken along line B-B' of FIG. 2.

FIG. 2 is a perspective view of a cutting insert in accordance with an embodiment of the present invention, and FIG. 3 is a plan view of FIG. 2. FIG. 4 is a cross-sectional view taken along line A-A' of FIG. 2, and FIG. 5 is a cross-sectional view taken along line B-B' of FIG. 2. In FIG. 2, since the lower surface of the cutting insert 200 is identically formed as an upper surface 210, a separate reference numeral is not assigned thereto.

Referring to FIGS. 2 to 5, the cutting insert 200 is manufactured from typically super hard alloy materials using a power metallurgy process, i.e., a mold joining, a PIM (Powder Injection Mold), a sintering process or the like. The cutting insert 200 includes an upper surface 210, a lower surface (not shown) parallel to the upper surface 210, a lateral surface 250 connecting the upper surface 210 and the lower surface, a corner lateral surface 270 connecting the neighboring lateral surfaces 250, and a minor lateral surface 260 connecting the opposite corner lateral surfaces 270.

The upper surface 210 or the lower surface of the cutting insert 200 is selectively used in turn in the cutting operation of a ferrous or non-ferrous metal. In other words, the upper surface 210 and the lower surface of the cutting insert 200 have symmetrical shapes thereof.

A circular opening 212 is perpendicularly and penetratingly formed at the center of the cutting insert 200, wherein the cutting insert 200 is in the form of a cubic about the center of the circular opening 212.

Preferably, formed on the upper surface 210 or the lower surface near the circular opening 212 are an inclined upper surface 242 and an inclined upper surface (not shown) which are inclined toward the circular opening 212.

A minor cutting edge 214 is provided at each corner of the upper surface 210 or the lower surface, in which the upper surface 210 or the lower surface meet the minor lateral surface 260 to form the minor cutting edge 214. Hereinafter, the detailed description will be made with reference to the upper surface 210 constructed by the same construction as the lower surface of the cutting insert 200.

A minor cutting edge land surface 216 and a minor cutting edge inclined surface 216 are respectively formed in turn between the minor cutting edge 214 and the upper surface 210.

Formed between the minor cutting edges 214 are a major cutting edge 220 and a corner cutting edge 222. Here, the upper surface 210 and the lower surface meet the lateral surface 250 to form the major cutting edge 220, while the upper surface 210 and the lower surface meet the corner lateral surface 270 to form the corner cutting edge 222.

The major cutting edge 220 is provided with a curved cutting edge 224 which is formed at the upper and lower portion of the center of the respective lateral surfaces 250 and inclined cutting edges 226 which are extended from the opposite sides of the curved cutting edge 224 toward the corner cutting edge 222. At this time, the curved cutting edge 224 is bent toward the middle portion at the center of the lateral surface 250, while the inclined cutting edge 226 is connected to the curved cutting edge 224 being crooked. The corner cutting edge 222 is designed to connect the respective inclined cutting edges 226 and the respective minor cutting edges 214, in which the corner cutting edge 222 is provided in a flat form. At this point, the major cutting edge 220 primarily makes contact with the workpiece to participate in the cutting operation, while the minor cutting edge 214 enhances the roughness of the machined surface of the workpiece.

A curved cutting edge land surface 228 and a curved cutting edge inclined surface 230 are formed in turn between the curved cutting edge 224 and the upper surface 210, while an inclined cutting edge land surface 232 and an inclined cutting edge inclined surface 234 are provided in turn between the inclined cutting edge 226 and the upper surface 210. Similarly, a minor cutting edge land surface 216 and a minor cutting edge inclined surface 218 are formed in turn between the minor cutting edge 214 and the upper surface 210, while a corner land surface 236 and a corner inclined surface 238 are provided in turn between the corner cutting edge 222 and the upper surface 210.

Meanwhile, a chip breaker 240 is provided on the curved cutting edge inclined surface 230 and the inclined cutting edge inclined surface 234 which meet the upper surface 210. The chip breaker 240 is formed in a concave shape on the curved cutting edge land surface 228 and the inclined cutting edge land surface 232 to be connected to the upper surface 210. Preferably, the chip breaker 240 is provided in the form of a concave groove lower than the curved cutting edge 224 such that the chip produced from the major cutting edge 220, which is performing the cutting operation, is discharged in a smooth flow in case of a high depth of cutting operation. More preferably, the chip breaker 240 in the portion where the major cutting edge 220 is lower than the upper surface 210 and the lower surface has a much larger width, and further it is formed to have the largest width in the lowest portion of the major cutting edge 220.

At least one surface of the major cutting edge 250 is provided with a concave nick cutting edge 252, which is an important feature of the present invention.

In case of a two-sided type insert shown in FIG. 2, the concave nick cutting edge 252 may be formed in a trench shape in the upward and downward direction of the lateral surface 250 to connect the major cutting edge 220 of the upper surface 210 and the major cutting edge (not shown) of the lower surface together.

Preferably, at least two concave nick cutting edges 252 are provided on any opposing two lateral surfaces 250 among the lateral surfaces 250, respectively. For example, two concave nick cutting edges 252 may be respectively provided on both a lateral surface positioned at the upper end and a lateral surface positioned at the lower end in FIG. 3. While not shown in the drawing, the concave nick cutting edge may be provided in an even number like four and six on any opposing two lateral surfaces, respectively. More preferably, the concave nick cutting edge 252 is symmetrically provided in the left and right direction on any opposing two lateral surfaces, respectively. In this case, a pair of the concave nick cutting edges 252, as shown in FIG. 3, may be provided at the portion of the lateral surface 250 on which the inclined cutting edge 226 is located.

It should be appreciated that since the concave nick cutting edges 252 are symmetrically provided in the left and right direction, it brings about effects to prolong the life span of the tool, wherein the cutting resistance is uniformly applied to the respective cutting edge portions of the cutting insert 200 to reduce the cutting resistance.

Alternatively, at least three concave nick cutting edges 252 may be provided on any opposing two lateral surfaces 250 among the lateral surfaces 250, respectively. Preferably, at least three concave nick cutting edges 252 are provided on the pair of lateral surfaces except for the pair of lateral surfaces on which the concave nick cutting edges 252 formed in an even number are located. For instance, three concave nick cutting edges 252 may be provided on both a lateral surface positioned at the left end and a lateral surface positioned at the right end, respectively in FIG. 3. While not shown in the drawing, the concave nick cutting edge may be of course provided in an odd number like five or seven on any opposing two lateral surfaces, respectively. More preferably, the concave nick cutting edge 252 is composed of a center concave cutting edge 252a on the pair of lateral surfaces 250, and opposite concave nick cutting edges 252b symmetrically formed in the left and right direction about the center concave cutting edge 252a. In this case, as shown in FIG. 3, the center concave cutting edge 252a may be formed at the portion where the curved cutting edge 224 is located, and a pair of opposite concave nick cutting edges 252b may be provided at the portion where the inclined cutting edge 226 is located.

As the opposite concave nick cutting edges 252b are symmetrically provided in the left and right direction about the center concave cutting edge 252a, it has effects to increase the life span of the tool, wherein the cutting resistance is uniformly applied to the respective cutting edge portions of the cutting insert 200 to reduce the cutting resistance.

Referring to FIG. 3, the cross-section of the concave nick cutting edge 252 may be in the form of a circular shape. While not shown in the drawing, the cross-section of the concave nick cutting edge may be of course formed in a triangle, a rectangle, a polygon or the like. Further, while not shown in the drawing, it may prevent coupling errors when mounting the cutting insert to the cutting body by indicating the number of the concave nick cutting edges on the upper surface of the cutting insert as well as on the cutter body.

It should be noted that the concave nick cutting edge 252 plays a role to reduce the friction and the cutting resistance by cutting the chip in a short form at a high depth of cutting to shorten the effective cutting edge. As a result, the life span of the tool can be extended. Further, the concave nick cutting edge 252 facilitates a chip disposal and reduces the cutting resistance, so as to increase a feed rate at a high depth of cutting, thereby enhancing the productivity of the cutting works.

Particularly, as shown in FIG. 2, if the concave nick cutting edge 252 is formed in a trench shape in the upward and downward direction along the lateral surface 250 so as to connect the major cutting edge 220 of the upper surface 210 and the major cutting edge of the lower surface, it may maximize the effects to shorten the effective cutting edge, to reduce the friction, and to reduce the cutting resistance.

In addition, according to a preferred embodiment, concave recesses 215 are formed in the same number as the concave nick cutting edges 252 at the locations corresponding to the concave nick cutting edges 252 on the upper surface 210 and the lower surface, respectively. Here, it is desirable that the concave recess 215 is provided correspondingly to each concave nick cutting edge 252.

Preferably, the concave recess 215 is disposed on the upper surface 210 or the lower surface in an imaginary line which is extended from the concave nick cutting edge 252 in a perpendicular inward direction with respect to the lateral surface 250. In other words, when the concave nick cutting edges 252 formed at the corresponding locations on the pair of lateral surfaces 250 facing each other are connected with each other with an imaginary straight line, the concave recess 215 is positioned in the imaginary straight line. For example, when the concave nick cutting edges 252 provided at the upper and lower ends in FIG. 3 are connected to each other with the imaginary straight line, the concave nick cutting edge at the upper left end and the concave nick cutting edge at the lower left end are connected to each other, while the concave nick cutting edge at the upper right end and the concave nick cutting edge at the lower right end are connected to each other. The respective concave recesses 215 are formed in the imaginary straight line connected as such.

Alternatively, the concave recess 215 may be disposed in an imaginary line which connects the concave nick cutting edge 252 and the center of the upper surface 210 or the lower surface.

As shown in FIG. 2, the concave recess 215 may be in the form of a semi-sphere. While not shown in the drawing, the concave recess may be of course formed in various shapes, such as a cube, a rectangular parallelepiped, a triangular prism or the like.

The concave recess 215 serves to reduce the cutting resistance between the chips cut in a short form by the concave nick cutting edge 252 and the upper surface 210 or the lower surface.

Particularly, it should be appreciated that by providing the concave recesses 215 corresponding to each concave nick cutting edge 252 in the inner side of the upper surface 210 or the lower surface, it is possible to maximize the effects to reduce the cutting resistance generated when the chip cut in a short form by the concave nick cutting edge 252 is introduced into the inner side of the upper surface 210 or the lower surface.

Figure 6:
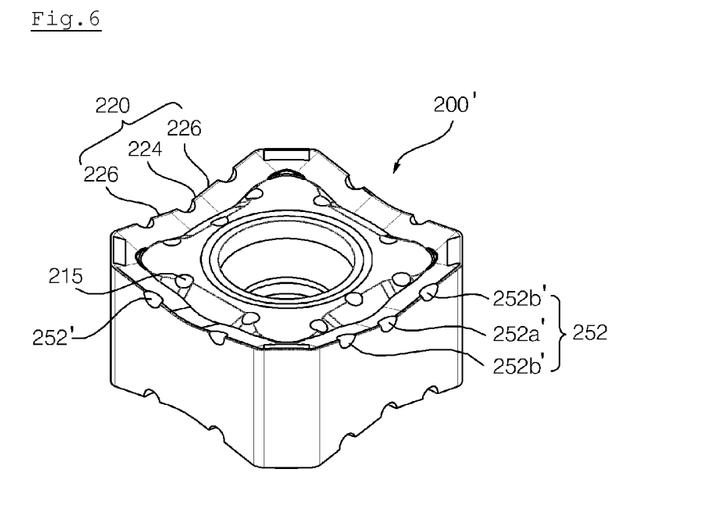
FIG. 6 is a perspective view of a cutting insert in accordance with another embodiment of the present invention.
Figure 7:
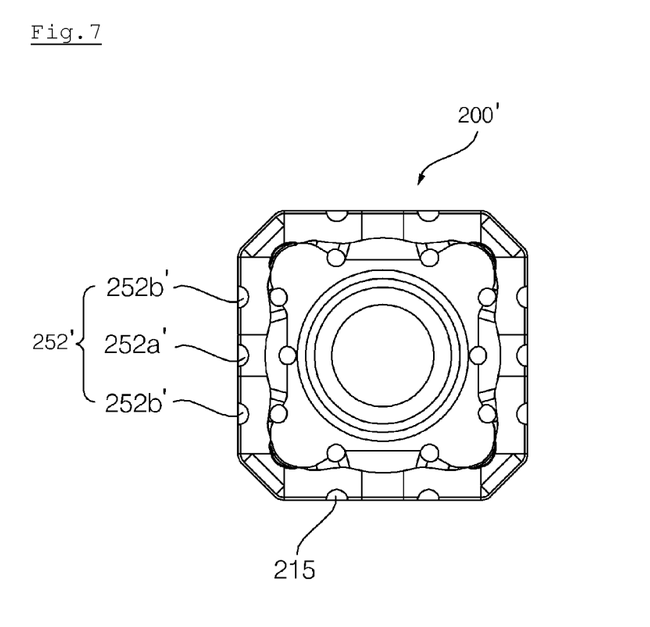
FIG. 7 is a plan view of FIG. 6.

FIG. 6 is a perspective view of a cutting insert in accordance with another embodiment of the present invention, and FIG. 7 is a plan view of FIG. 6. Since the embodiment illustrated in FIG. 6 is similar to the embodiment shown in FIG. 2 except that the concave nick cutting edge is formed only at the major cutting edge instead of being formed on the entire lateral surface, the description will be focused on the differences thereof hereinbelow.

Referring to FIG. 6, in a cutting insert 200' according to another embodiment of the present invention, a concave nick cutting edge 252' is formed only at the portion of the major cutting edge 220.

The concave nick cutting edge 252' may be symmetrically provided in the left and right direction at any two opposing major cutting edges 220 among the major cutting edges 220 in an even number, at least two, respectively. Moreover, the concave nick cutting edge 252' may be provided at the remaining pair of major cutting edges 220 in an odd number, at least three, respectively.

The concave nick cutting edges 252' provided in an even number may be formed in pairs at the locations in which the inclined cutting edges 226 are located. In contrast, the concave nick cutting edges 252' provided in an odd number include a central concave nick cutting edge 252a' and opposite concave nick cutting edges 252b' which are symmetrically formed in the left and right direction about the central concave nick cutting edge. Here, the central concave nick cutting edge 252a' may be formed at the curved cutting edge 224, while the opposite concave nick cutting edges 252b' may be provided in pairs at the inclined cutting edge 226.

As described above, since the concave nick cutting edge 252' is provided only at the major cutting edge 220 instead of being provided on the entire lateral surface 250, it is possible to perform a nick cutting edge function without deforming the seat lateral surface of the seat portion to couple the cutting insert 200' with the cutter body 300.

Although several exemplary embodiments of the present invention have been described for illustrative purposes, those skilled in the art will appreciate that various modifications, additions and substitutions are possible, without departing from the scope and spirit of the invention as disclosed in the accompanying claims.

Industrial Applicability

The present invention relates to a cutting tool for milling works which employs a cutting insert, which can be broadly applied to milling works such as a planar cutting, a lateral cutting, a groove cutting, an inclination cutting, a curved surface cutting or the like.

The invention claimed is:

1. A cutting tool for milling works including a cutting insert which is perpendicularly and penetratingly formed with a circular opening in its center, a cutter body on which the cutting insert is mounted, and a coupling means to secure the cutting insert to the cutter body, the cutting insert comprising:
    an upper surface and a lower surface;
    a lateral surface connecting the upper surface and the lower surface;
    wherein the upper or the lower surface meets the lateral surface to form a major cutting edge; and
    wherein at least one major cutting edge is provided with one or more concave nick cutting edges,
    wherein the cutting insert is a two-sided type insert of which upper and lower surfaces perform a cutting work; and
    wherein the insert includes a corner lateral surface to connect the neighboring lateral surfaces and a minor lateral surface to connect the corner lateral surface at the opposite sides of the corner lateral surface, wherein the upper surface or the lower surface meets the minor lateral surface to form a minor cutting edge, wherein a corner cutting edge to connect the major cutting edge and the minor cutting edge is formed between the minor cutting edge and the major cutting edge, and wherein a circular opening which penetrates into the center of the upper surface and the lower surface is provided.

2. The cutting tool as recited in claim 1, wherein the concave nick cutting edges are symmetrically provided in the left and right direction in an even number, at least two at any opposing two major cutting edges or neighboring two major cutting edges, respectively.

3. The cutting tool as recited in claim 1, wherein the concave nick cutting edges are symmetrically provided in an odd number at least three at any opposing two major cutting edges or neighboring two major cutting edges, respectively.

4. The cutting tool as recited in claim 3, wherein the concave nick cutting edge includes a central concave nick cutting edge formed at the respective two major cutting edges, and opposite concave nick cutting edges symmetrically provided in the left and right direction about the central concave nick cutting edge.

5. A cutting tool for milling works including a cutting insert which is perpendicularly and penetratingly formed with a circular opening in its center, a cutter body on which the cutting insert is mounted, and a coupling means to secure the cutting insert to the cutter body, the cutting insert comprising:
    an upper surface and a lower surface;
    a lateral surface connecting the upper surface and the lower surface;
    wherein the upper or the lower surface meets the lateral surface to form a major cutting edge; and
    wherein at least one major cutting edge is provided with one or more concave nick cutting edges,
    wherein the upper surface or the lower surface is provided with a concave recess in an inward direction perpendicular to the lateral surface from the concave nick cutting edge, wherein the concave recess is formed in the same number as the concave nick cutting edge corresponding to each concave nick cutting edge.

6. A cutting tool for milling works including a cutting insert which is perpendicularly and penetratingly formed with a circular opening in its center, a cutter body on which the cutting insert is mounted, and a coupling means to secure the cutting insert to the cutter body, the cutting insert comprising:
    an upper surface and a lower surface;
    a lateral surface connecting the upper surface and the lower surface;
    wherein the upper or the lower surface meets the lateral surface to form a major cutting edge; and
    wherein at least one major cutting edge is provided with one or more concave nick cutting edges,
    wherein the upper surface or the lower surface is provided with a concave recess in an inward direction at the center of the upper surface or the lower surface from the concave nick cutting edge, wherein the concave recess is formed in the same number as the concave nick cutting edge corresponding to each concave nick cutting edge.

7. The cutting tool as recited in claim 5, wherein the surface of the concave recess is formed in a semi-sphere shape.

8. The cutting tool as recited in claim 1 wherein the concave nick cutting edge is correspondingly formed in the upward and downward direction at the major cutting edge of the upper surface and the major cutting edge of the lower surface.

9. The cutting tool as recited in claim 1,
    wherein an inclined upper surface and an inclined lower surface are formed near the circular opening on the upper surface and the lower surface.

10. The cutting tool as recited in claim 1,
    wherein the upper and lower surfaces meet the minor lateral surface to form the minor cutting edge, and the a minor cutting edge land surface and a minor cutting edge inclined surface are formed in turn between the minor cutting edge and the upper and lower surfaces.

11. The cutting tool as recited in claim 1,
    wherein the minor cutting edge and the corner cutting edge are formed higher than the upper and lower surfaces.

12. The cutting tool as recited in claim 1,
    wherein the major cutting edge includes a curved cutting edge which is bent from the upper and lower portion of the center of the respective lateral surfaces to the middle portion of the center of the lateral surface and formed lower than the upper and lower surfaces, and a straight inclined cutting edge which is increasingly extended toward the corner cutting edge at the opposite sides of the curved cutting edge, wherein the major cutting edge is symmetrical about the curved cutting edge.

13. The cutting tool as recited in claim 1,
    wherein the minor cutting edge is provided as a convex curve, which is projected to the upper portion of the respective corner cutting edges, and is connected to the corner cutting edges disposed at the opposite sides.

* * * * *